L. R. CLAUSEN.
SIDE DELIVERY RAKE.
APPLICATION FILED OCT. 29, 1917.
1,283,674.
Patented Nov. 5, 1918.
2 SHEETS—SHEET 1.
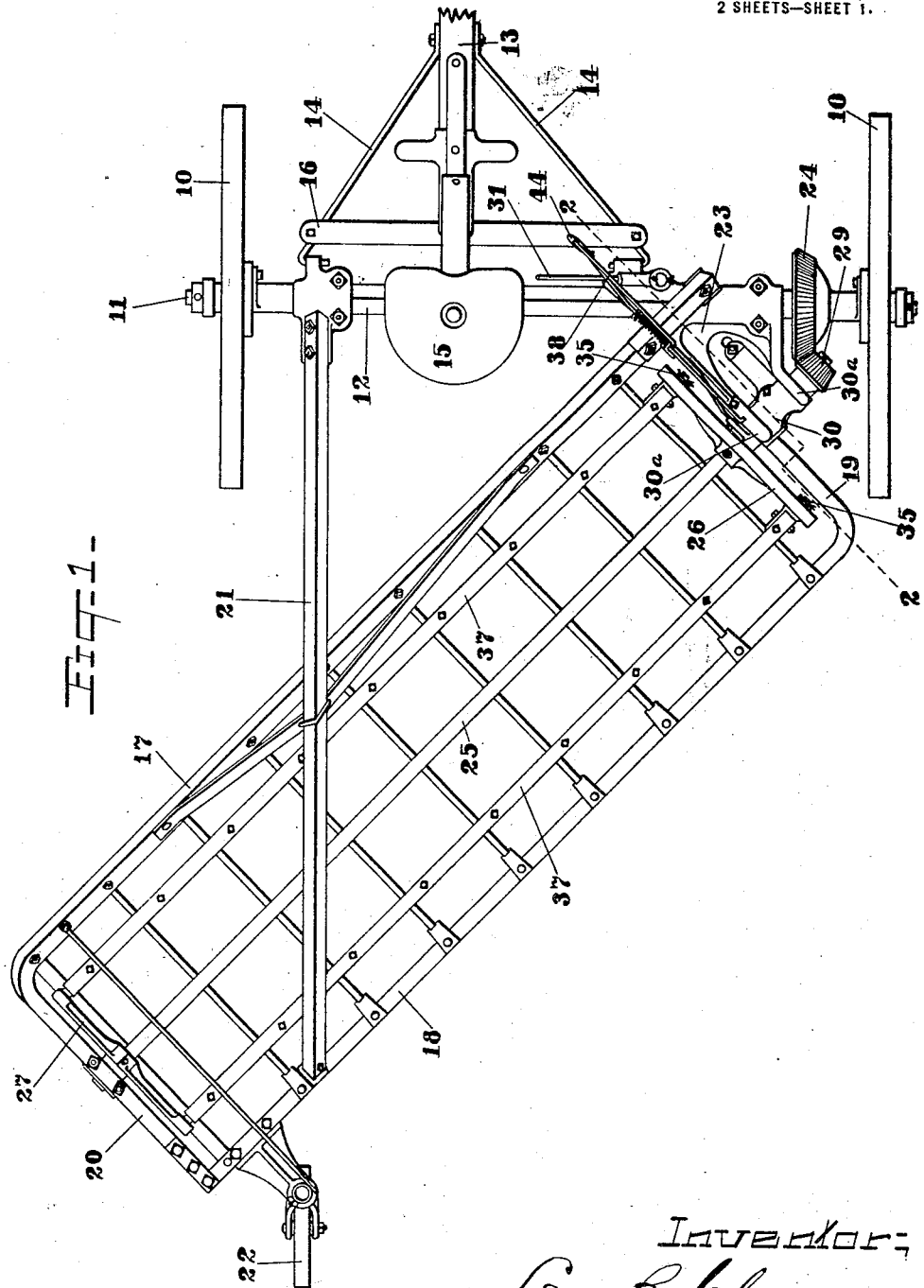

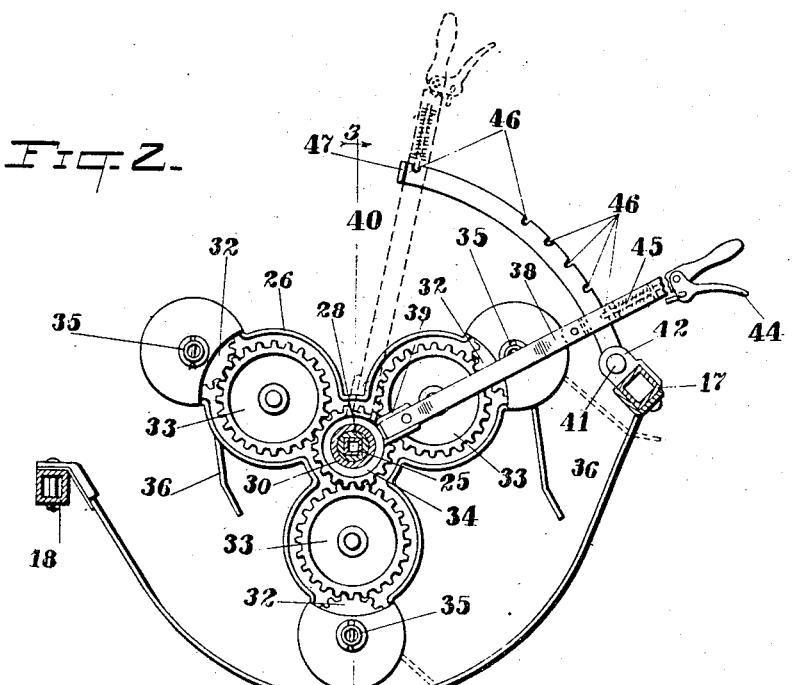
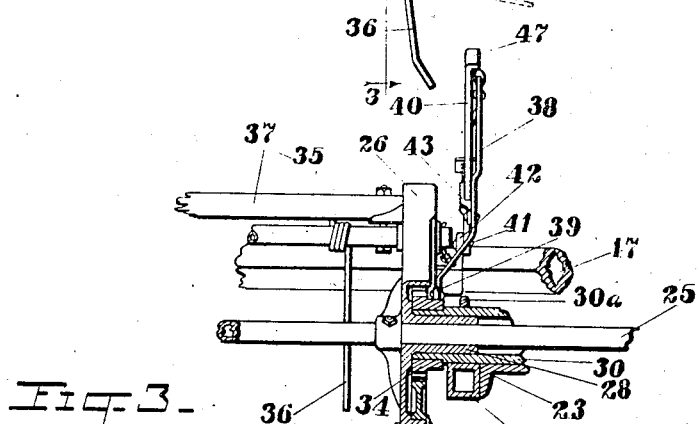

UNITED STATES PATENT OFFICE.

LEON R. CLAUSEN, OF OTTUMWA, IOWA, ASSIGNOR TO DAIN MANUFACTURING COMPANY OF IOWA, OF OTTUMWA, IOWA, A CORPORATION OF IOWA.

SIDE-DELIVERY RAKE.

1,283,674.    Specification of Letters Patent.    Patented Nov. 5, 1918.

Application filed October 29, 1917. Serial No. 198,986.

*To all whom it may concern:*

Be it known that I, LEON R. CLAUSEN, a citizen of the United States, and a resident of Ottumwa, in the county of Wapello, State of Iowa, have invented certain new and useful Improvements in Side-Delivery Rakes, of which the following is a specification, reference being had to the accompanying drawings.

This invention relates to side-delivery rakes of the type wherein a rotary reel is arranged to stand at an angle to the line of draft and which carries several series of rake teeth, all of the teeth of the several series being maintained at the same angle so as to be properly presented in effective working position to the hay upon the ground. Such teeth are held in the desired uniform working position by the employment of suitable mechanism carried by the forward head of the reel, and while such teeth have ordinarily been maintained in a substantially vertical position during the rotation of the reel it has been found very desirable under certain conditions to incline the teeth more or less from such vertical position in order that they may best meet the conditions that exist in any particular field or meadow. It is desirable to effect such a change in the position of the teeth from time to time without stopping the machine in order that the teeth may be given greater clearance on account of rough ground and thereby obviate the shocks and strains that would naturally result from the teeth meeting with obstructions or from the teeth dragging on the ground when the wheels of the machine drop into depressions. Such change in the position of the teeth is also frequently advantageous to better adapt them to the character of the hay being raked. Furthermore, when the machine is not being used for raking but is being transported to and from a field, and with the reel not revolving of course, it is highly desirable that such teeth have their points turned up as far as possible from the surface of the ground or roadway.

It is the object of my invention to provide simple and effective means for shifting the angle of the teeth from a vertical position which means can be readily operated by the driver from his seat on the machine,— such operation being performed while the machine is in motion and whether the reel is in operative engagement with the main driving means or is disengaged therefrom. This object I accomplish by the parts and combinations of parts shown in the drawings and hereinafter described. That which I believe to be new is set forth in the claims.

In the drawings:

Figure 1 is a plan view of a side-delivery rotary rake embodying my improvements;

Fig. 2 is a section taken substantially at line 2—2 of Fig. 1 and showing in end elevation the front reel-head with the gearing mounted thereon that maintains the teeth of the various series in proper working position, and showing also my improved means for effecting a change in the position of such teeth. In such figure is shown in dotted lines a changed position of the teeth and of the means employed to effect such change; and Fig. 3 is a vertical section on the line 3—3 of Fig. 2.

Referring to the figures of the drawings,—10—10 indicate a pair of carrying wheels which are mounted upon an axle 11, such wheels and axle being connected together by any suitable means so that the axle will be caused to rotate upon the forward movement of the machine. 12 indicates a bar through which the axle 11 extends and in which it is journaled,—such bar being preferably a sleeve whose exterior surface is square in cross-section the better adapting it for attachment to other parts hereinafter mentioned. 13 indicates a tongue laterally supported by braces 14. 15 indicates a driver's seat mounted in any suitable manner upon the tongue 13 and upon a cross-bar 16 that extends between the braces 14 at the rear end of the tongue. 17—18 indicate respectively the front and rear members and 19 and 20 the end members of a diagonally-arranged frame in which the rotatable reel is mounted—19 being applied to the end member at the forward end and 20 to the end member at the rear end. As shown, the members 17 and 20 are formed integral with each other, and the members 18 and 19 integral with each other, but any suitable construction of the frame may be employed. 21 indicates a beam the front end of which is secured in any suitable manner to the hollow cross-bar 12, such beam extending back over the reel frame and being secured to the rear member 18 thereof. 22 indicates a caster wheel suitably connected to the reel frame near the rearmost corner thereof. The reel-supporting frame is connected at its forward end with the hollow cross-bar 12 through a heavy supporting plate or bracket 23 which is secured in any usual manner to the hollow cross-bar 12 and also to the end member 19 of the reel frame. Securely affixed to the axle 11 between one of the wheels 10 and the supporting plate or bracket 23 is a bevel gear 24. 25 is a shaft passing centrally through the reel frame, such shaft being journaled at its rear end in the member 20 of such frame. Near each end member of the reel frame and suitably secured to said shaft 25 so as to turn therewith is a reel head, the front reel head being indicated by 26 and the rear reel head by 27. The front reel head has a forwardly-extending sleeve 28 that is preferably integral with such head, and through such sleeve 28 extends the forward end of the said central shaft 25, which end portion is angular in cross-section, as shown in Fig. 2, to correspond to the angular interior surface of the sleeve 28. 29 indicates a bevel pinion secured on the angular front end of the central shaft 25 and adapted to mesh with the bevel gear 24. 30 indicates a slide-box surrounding the sleeve member 28, such slide-box being adapted to be given a limited movement relative to the reel-supporting frame so as to move the bevel pinion 29 into or out of mesh with the bevel pinion 24. Such movement of the slide-box is effected through a hand lever 31 and suitable connections between such lever and the slide-box. Such slide-box bears upon the front member 19 of the reel frame and the plate or bracket 23 that extends out from such member, and fingers 30$^a$ project over said slide-box and serve as guides therefor. Inasmuch as the means I employ for effecting this movement of the slide-box are fully illustrated and described in the Letters Patent No. 886,681, dated May 5, 1908, to Joseph Dain, I do not deem it necessary to here illustrate and describe in detail such means. Furthermore, any other arrangement of parts than that shown in the said Dain patent may be employed for this purpose. The outer face of the front reel-head 26 has pivotally mounted thereon three gears 32, to each of which is securely affixed one of the three tooth bars employed in the machine. 33 indicates three other gears rotatably mounted on the reel-head 26 and in mesh respectively with the gears 32. 34 indicates a gear at the central portion of said reel-head 26 and in mesh with each one of the gears 33. 35 indicates the tooth bars hereinbefore referred to, said bars being journaled in the two reel-heads 26—27, and, as stated, each having securely affixed to it at its forward end one of the gears 32. 36 indicates the rake teeth connected with the tooth bars 35 and held in proper relation to the tooth bars by the usual beams 37 that extend above such bars.

With the shaft 25 rotated, as will be understood, by reason of the engagement of the bevel gears 24 and 29, and with the central gear 34 held against rotation as fully described in the said Dain Patent No. 886,681, it will be evident that the rake teeth 36 will at all times be held in proper working position. In the construction of the said Dain patent the gear corresponding to the gear here indicated by 34 was so secured in place as to be immovable with relation to the reel-head that it was connected with. It followed, therefore, that the rake teeth were always maintained in one position. As hereinbefore pointed out, however, it has been found in practice to be very desirable to quickly change the inclination of the teeth to suit varying conditions and to effect such changing without stopping the motion of the machine. I have therefore provided means for giving to the said central gear, whenever desired, an independent rotation and thereby, through a consequent turning of the other gears 33 and 32 turn the teeth to stand at the desired angle. To accomplish this I mount such central gear 34 revolubly upon the slide-box 30 and turn it on such box through the medium of an adjusting hand lever 38 that is rigidly connected to an arm 39 formed with and projecting from the hub portion of such gear 34. This hand lever has loosely connected with it a sector 40. Said sector at its lower end is pivoted at 41 to a suitable bracket 42 that is secured upon the front member 17 of the reel-supporting frame. The sector is otherwise unsupported in position except by the lever 38 with which it coöperates, and it receives support from such lever by reason of resting against a small bracket 43 (see Fig. 3) that is, in the form of construction shown, made from a bent metal strip affixed to one side of said lever. The lever is provided with an ordinary pivoted hand latch 44 and spring-controlled plunger 45 connected therewith which is adapted to be seated in any one of a series of notches 46 in the upper edge of the sector.

With the machine in use and assuming that the three series of rake teeth 36 are in substantially vertical position as shown in Fig. 2, the driver in order to change the position of the teeth has only to raise the plunger 45 out of engagement with the notch that it is then in and by a stroke of such lever along the sector there will be caused a rotation of the central gear 34 and such rotation will, as will be readily understood, rotate the three gears 33 and through them the three outermost gears 32 to which the three sets of rake teeth 35 are respectively connected. The extent to which the teeth will be rocked is, of course, determined by the length of stroke given to the lever 38. When the teeth have been brought to the desired position, the lever will be locked to the segment again by allowing the plunger 45 to engage one of the notches in the sector and thereupon the central gear 34 will act as a fixed gear as in the construction described in the said Dain patent. Of course, if the driver desires the rake teeth shifted into another position momentarily in order to avoid an obstruction he need only to give the lever a quick stroke and not engage it at all with any notch in the sector, but immediately after passing the obstruction return the lever to its original position.

When the front end of the reel is moved laterally so as to throw the pinion 29 out of operative engagement with the gear 24 such movement will necessarily cause a slight turning of the sector on its pivot and that will be permitted because of the fact that the plunger 45 is small enough to allow it a little play in the notch that it then rests in. By reason of this turning movement of the sector each time that the reel is moved bodily to carry its pinion 29 into or out of mesh with the driving gear 24 the driver of the machine does not at such times have to handle or pay any attention whatever to the lever 38. It will be evident that by means of the said lever 38 the angle of the teeth can be instantly adjusted from one to the other of the extreme positions indicated by full lines and dotted lines in Fig. 2, respectively, or to any desired intermediate position. It will be noted that the free end of the sector is turned as at 47 to provide a stop for preventing disengagement of the lever with the sector.

What I claim as my invention and desire to secure by Letters Patent, is—

1. In a rotary rake, the combination with a frame, a rake-reel journaled therein and movable laterally thereof, raking devices carried by said reel, and means for rotating the reel when it is in one of its laterally-adjusted positions, of gearing carried by said reel for maintaining the raking devices in position, an adjusting lever connected with said gearing for turning the same to change the position of the raking means, and means for locking said lever in different adjusted positions but permitting it to move with the lateral movement of the reel, said means comprising interengaging means mounted on the lever and frame respectively, the point of attachment of the member on the frame being unaffected by movement of the reel.

2. In a rotary rake, the combination with a frame, a rake-reel journaled therein and movable laterally thereof, raking devices carried by said reel, and means for rotating the reel when it is in one of its laterally-adjusted positions, of gearing carried by said reel for maintaining the raking devices in position, an adjusting lever connected with a rotatable member of said gearing for turning the same to change the position of the raking means, and yielding means for engaging the lever to hold it and said gearing member in different adjusted positions but permitting it to move laterally when the reel is moved laterally, said means comprising interengaging means mounted on the lever and frame respectively, the point of attachment of the member on the frame being unaffected by movement of the reel.

3. In a rotary rake, the combination with a frame, a rake-reel journaled therein and movable laterally thereof, raking devices carried by said reel, and means for rotating the reel when it is in one of its laterally-adjusted positions, of gearing carried by said reel for maintaining the raking devices in position, an adjusting lever connected with a rotatable member of said gearing for turning the same to change the position of the raking means, and means for engaging the lever to hold it and said gearing member in different adjusted positions, said lever-engaging means being pivoted to a fixed support.

4. In a rotary rake, the combination with a frame, a rake-reel journaled therein and movable laterally thereof, raking devices carried by said reel, and means for rotating the reel when it is in one of its laterally-adjusted positions, of gearing carried by said reel for maintaining the raking devices in position, an adjusting lever connected with a rotatable member of said gearing for turning the same to change the position of the raking means, and means for engaging the lever to hold it and said gearing member in different adjusted positions, said lever-engaging means being mounted on a pivot at a distance from and parallel with the axis of rotation of the reel when said reel is in position to be rotated.

5. In a rotary rake, the combination with a frame, a rake-reel journaled therein and movable laterally thereof, raking devices carried by said reel, and means for rotating the reel when it is in one of its laterally-adjusted positions, of gearing carried by said reel for maintaining the raking devices in position, an adjusting lever connected with said gearing for turning the same to change the position of the raking means, a movable sector, locking means carried by the lever for adjustably securing the lever to the sector, and other means on the lever for supporting the sector, said lever and sector both being movable with the reel when said reel is moved laterally.

6. In a rotary rake, the combination with a frame, a rake-reel journaled therein and movable laterally thereof, raking devices carried by said reel, and means for rotating the reel when it is in one of its laterally-adjusted positions, of gearing carried by said reel for maintaining the raking devices in position, an adjusting lever connected with said gearing for turning the same to change the position of the raking means, a pivotally mounted sector loosely engaging the lever and supported thereby and movable therewith when the reel is moved laterally, and means on the lever for locking the lever to the sector.

LEON R. CLAUSEN.

Copies of this patent may be obtained for five cents each, by addressing the "Commissioner of Patents, Washington, D. C."